Feb. 28, 1939.   W. R. BRISON   2,148,743
OIL HEATER
Filed Dec. 5, 1935
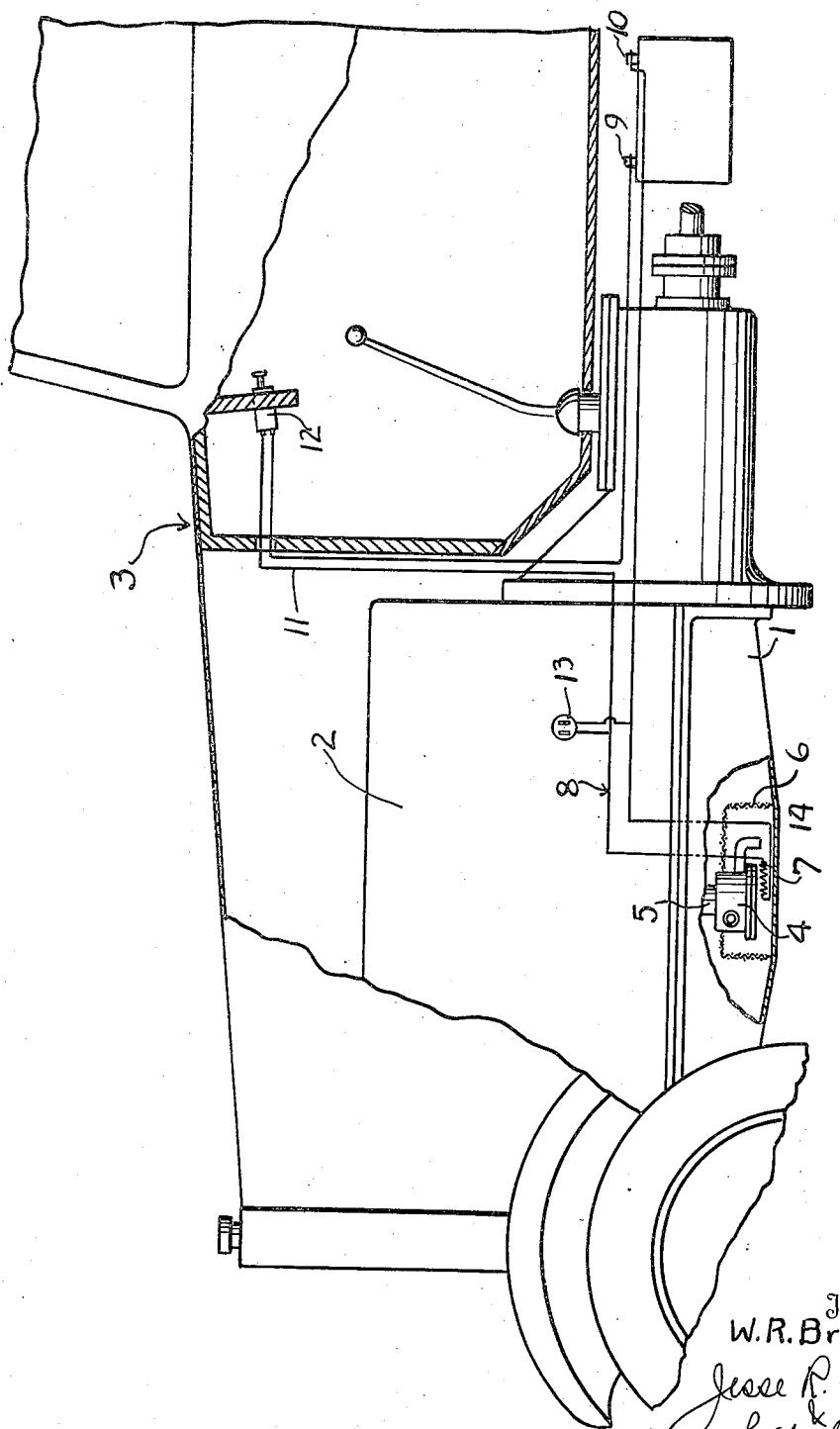
Inventor
W. R. Brison
By Jesse R. Stone
 & Lister B. Clark
Attorneys Patented Feb. 28, 1939

2,148,743

UNITED STATES PATENT OFFICE 2,148,743

OIL HEATER

William R. Brison, Baytown, Tex.

Application December 5, 1935, Serial No. 52,975

1 Claim. (Cl. 219—38)

This invention relates to heating the lubricant in connection with internal combustion engines. It has its particular application to engines employed in the propelling of motor vehicles.

It is a common experience, particularly in cold weather, to find that the lubricant which is intended to lubricate the moving parts of the motor is not easily circulated to the said moving parts while it is cold and viscous. Owing to this condition many good lubricating stocks have necessarily been discarded from use in internal combustion motors. The oil is contained in the crank case below the motor and ordinarily a pump is employed to pump the lubricant from the crank case to the parts to be lubricated from the crank case lubricating system. When the engine is started up on a cold morning it takes a material amount of time before the crank case gets sufficiently hot to make the lubricant fluid enough to be picked up by the pump and circulated to the motor. For this reason the bearings and other parts needing lubrication will become heated and burned out before any lubricant is pumped thereto.

It is an object of my invention to provide means to heat the lubricant in the crank case so that it may be made fluid so that the lubricant may be easily pumped and circulated to the parts to be lubricated, thus avoiding any possibility of the parts becoming overheated and burned out.

I desire to provide an electrical heating unit which can be connected with the circuit of the battery where desired and which may be energized so as to heat the oil quickly.

It is another object to provide means to heat the oil adjacent the inlet to the lubricant pump and thus assure that the oil adjacent the inlet will be fluid enough to be easily pumped and carried to the moving parts of the motor.

In the drawing herewith I have shown a broken detail of a motor vehicle, the crank case being broken away to show the application of my invention in heating the lubricant therein, this view being shown diagrammatically with the unit connected with the battery of the car.

In the drawing I have shown my invention as employed with the crank case 1 of the motor 2 of a motor vehicle shown generally at 3. The particular construction of the vehicle, the motor and the crank case are not the novel features of my invention and need not be further shown.

The crank case 1 below the motor is shown as having a lubricant pump 4 therein of ordinary construction, there being an inlet pipe to the pump through which fluid may be circulated upwardly through the pipe 5 to the parts of the motor. I have shown the pump and the inlet pipe thereon as surrounded by a screen 6, as is customarily done.

The heating unit which is employed in heating the lubricant adjacent the inlet is preferably made up of a resistance coil 7, connected in an electric circuit represented at 8. This heating unit may be of any preferred construction and is positioned preferably closely adjacent to the pump inlet so that the pump will be able to draw the heated oil directly into the pump through the suction pipe.

The electric circuit 8 is shown as connected with the posts 9 and 10 of the battery. There is a branch line in the circuit shown at 11 leading to a switch 12 on the instrument board of the car. This switch may be employed to break or close the circuit from the battery to the heating element.

I may also place a plug socket 13 in the circuit so that the circuit may be connected up with a source of electricity outside the vehicle, such as a lamp circuit or the like. Manifestly the heater may be thermostatically controlled if desired.

In the use of my device I contemplate switching on the current to the heating element before the car is started up. This will assure that there will be sufficient lubricant taken up immediately by the pump to keep the moving parts from being overheated and worn before the whole charge of oil in the crank case becomes fluid. Under ordinary circumstances the amount of time necessary to heat up the oil at the inlet to the oil pump will be short and no material amount of time will need to be wasted in waiting for the oil to heat up before the motor is started.

While I have shown my device as employed upon a motor vehicle it is to be understood that it is applicable generally to internal combustion engines where automatic or mechanical circulation of lubricant to the motor parts is employed.

What is claimed as new is:

In combination with an internal combustion motor having a crank case, a lubricant circulating pump positioned in the crank case, an inlet from the crank case into said pump through which the lubricant enters said pump, a heating unit to heat both said pump and said inlet whereby the lubricant entering the pump will be heated, and a strainer enclosing said inlet, pump and heating unit so that the lubricant is heated after passing through said strainer and while entering said inlet.

WILLIAM R. BRISON.